US005747670A

United States Patent [19]

Takahashi et al.

[11] Patent Number: 5,747,670

[45] Date of Patent: May 5, 1998

[54] APPARATUS FOR DETECTING COMBUSTION STATE IN INTERNAL COMBUSTION ENGINE

[75] Inventors: Yasuhiro Takahashi; Wataru Fukui, both of Tokyo, Japan

[73] Assignee: Mitsubishi Denki Kabushiki Kaisha, Tokyo, Japan

[21] Appl. No.: 742,489

[22] Filed: Nov. 1, 1996

[30] Foreign Application Priority Data

Jun. 14, 1996 [JP] Japan .................... 8-154037

[51] Int. Cl.$^6$ .................... G01L 23/22

[52] U.S. Cl. .................... 73/35.08

[58] Field of Search .................... 73/35.08, 35.16, 73/35.01, 35.14; 324/459, 380, 388, 393

[56] References Cited

U.S. PATENT DOCUMENTS 5,561,239 10/1996 Yasuda .................... 73/35.08
5,563,332 10/1996 Yasuda .................... 73/35.08

FOREIGN PATENT DOCUMENTS 4-53283 2/1992 Japan .

*Primary Examiner*—Christine K. Oda

*Attorney, Agent, or Firm*—Sughrue, Mion, Zinn, Macpeak & Seas, PLLC

[57] ABSTRACT

A combustion state detecting apparatus for an internal combustion engine capable of detecting combustion state in the engine with high accuracy and reliability by deriving an ion current detection signal which is based on only an ion current by canceling out a leakage current component. The apparatus includes a high-voltage diode (11$a$, . . . , 11$d$) connected to a spark plug (8$a$, . . . , 8$d$), a bias voltage applying circuit (9) for applying a bias voltage (VBi) to the spark plug by way of the high-voltage diode, an ion current detecting circuit (12) for detecting an ion current (i) flowing through the spark plug immediately after ignition to thereby output an ion current detection signal (Ei), an electronic control unit (2) for determining combustion state of the engine on the basis of the ion current detection signal (Ei), and a leakage current compensating means (21, 22) connected in parallel with the ion current detecting means (12). The leakage current compensating means supplies a compensating current (ic) for canceling out a leakage current component (iL) flowing along a same path as the ion current (i). The ion current detecting means outputs as the ion current detection signal only an ion current signal component (io) from which the leakage current has been eliminated.

5 Claims, 6 Drawing Sheets

APPARATUS FOR DETECTING COMBUSTION STATE IN INTERNAL COMBUSTION ENGINE

BACKGROUND OF THE INVENTION

1. Field of the Invention

The present invention relates to a combustion state detecting apparatus for detecting combustion state in an internal combustion engine by detecting change in an ion current generated upon combustion of an air-fuel mixture within the engine. More particularly, the present invention is concerned with a combustion state detecting apparatus for an internal combustion engine, which apparatus can ensure acquisition of an ion current detection signal with high reliability by canceling out a leakage current component which is likely to be superposed on the ion current due to contamination or spoil of a spark plug.

2. Description of Related Art

In general, in the internal combustion engine, an air-fuel mixture is charged into a combustion chamber defined within each of the engine cylinders to be subsequently compressed during a compression stroke by a piston moving reciprocatively within the cylinder, which is then followed by application of a high voltage to a spark plug mounted in the cylinder, for thereby generating a spark between electrodes of the plug. Thus, the compressed air-fuel mixture is fired or ignited. Explosion energy resulting from the combustion is then converted into a movement of the piston in the direction reverse to that in the compression stroke, which motion is translated into a torque outputted from the internal combustion engine via a crank shaft.

When combustion of the compressed air-fuel mixture takes place within the engine cylinder, molecules prevailing within the combustion chamber are ionized. Thus, by applying a bias voltage to an ion current detecting electrode mounted in the combustion chamber, an amount of ions carrying electric charges are caused to move under the bias voltage, giving rise to an ion current flow. In that case, intensity of the ion current varies with high sensitivity in dependence on the combustion state within the combustion chamber. This in turn means that the combustion state within the engine cylinder can discriminatively be determined by detecting the change of the ion current.

The ion current apparatus in which the electrodes of the spark plugs are employed as the electrodes for detecting the ion current is known in the art, as is disclosed, for example, in Japanese Unexamined Patent Application Publication No. 104978/1990 (JP-A-2-104978). However, this known the apparatus is designed for detecting unsatisfactory or incomplete combustion (e.g. misfire event) on the basis of the intensity of the ion current as detected immediately after the ignition.

For having better understanding of the present invention, description will first be made of the technical background in some detail. FIG. 5 is a block diagram showing generally a configuration of a conventional combustion state detecting apparatus for a four-cylinder internal combustion engine, wherein a high voltage is applied distributively to spark plugs of individual engine cylinders, respectively, through the medium of a distributor. Further, FIG. 6 is a timing chart for illustrating operation of the apparatus shown in FIG. 5 on the assumption that a leakage current iL is generated concurrently with an ion current i because of contamination of spark plugs 8*a*–8*d* or for any other reason.

Referring to FIG. 5, there is provided in association with a crank shaft (not shown) of an internal combustion engine (not shown either and hereinafter also referred to simply as the engine) a crank angle sensor 1 which is adapted to output a crank angle signal SGT containing a number of pulses generated at a frequency which depends on a rotation number or speed (rpm) of the engine.

The leading edges of the pulses contained in the crank angle signal SGT indicate angular reference positions for the individual engine cylinders in terms of crank angles, respectively. The crank angle signal SGT is supplied to an electronic control unit 2 which may be constituted by a microcomputer, to be used for performing various controls and arithmetic operations therefor.

The electronic control unit 2 is so designed as to fetch the engine operation information signals from various sensors (not shown) either together with the crank angle signal SGT outputted from the crank angle sensor 1 and perform various arithmetic operations on the basis of these input data, to thereby generate driving signals for a variety of actuators and devices inclusive of an ignition coil 4.

A driving signal P for the ignition coil 4 is applied to a base of a power transistor TR connected to a primary winding 4a of the ignition coil 4 for turning on/off the power transistor TR. More specifically, the power transistor TR is turned off in response to the driving signal P, whereby a primary current i1 is interrupted. Upon interruption of the primary current i1, a primary voltage V1 appearing across the primary winding 4*a* rises up steeply, whereby a secondary voltage V2 further boosted up is induced in a secondary winding 4*b* of the ignition coil 4 and makes appearance thereacross as a voltage of high level (usually on the order of several ten kilovolts). One of the primary and secondary windings of the ignition coil 4 are connected together to a power supply source such as an onboard battery.

The distributor 7 which is connected to an output terminal of the secondary winding 4*b* operates to distribute and apply the secondary voltage V2 sequentially to spark plugs 8*a*, . . . , 8*d* mounted in the engine cylinders, respectively, in synchronism with the rotation of the engine, whereby spark discharges take place within combustion chambers defined in the engine cylinders, respectively, triggering the combustion of the air-fuel mixture confined within the combustion chambers.

Connected between the other end of the primary winding 4*a* of the ignition coil 4 and the ground is a series circuit composed of a rectifier diode D1, a current limiting resistor R, a capacitor 9 connected in parallel with a Zener diode DZ and a rectifier diode D2. The series circuit mentioned above constitutes a path for allowing a charging current to flow to a bias voltage source which serves for applying a bias voltage for detecting an ion current, as described below.

A capacitor 9 is connected in parallel with the Zener diode DZ which serves for voltage limiting function. The capacitor 9 is charged to a voltage level corresponding to the reverse breakdown voltage of the Zener diode DZ (i.e., the bias voltage VBi on the order of several hundred voltages) by a charging current which flows to the capacitor 9 under the primary voltage VI and which thus serves as the bias voltage source for supplying the bias voltage for detecting the ion current i, as mentioned above. To this end, the capacitor 9 is so connected as to discharge by way of the spark plug (8*a*, . . . , 8*d*) immediately after the ignition, allowing the ion current i to flow therethrough.

Connected to the other end of the capacitor 9 are cathodes of high-voltage diodes 11*a*, . . . , 11*d*, respectively, which have respective anodes connected to one end of the spark plugs 8*a*, . . . , 8*d*, respectively, so as to apply the bias voltage VBi to these plugs with a same polarity as that of the firing or igniting voltage. On the other hand, connected to the other end of the capacitor 9 is a current-to-voltage conversion circuit 12 which incorporates an output resistor (not shown) for converting the ion current into a voltage signal which is outputted as an ion current detection signal Ei. The current-to-voltage conversion circuit 12 thus constitutes an ion current detecting means.

The current-to-voltage conversion circuit 12 is connected to the other ends of the spark plugs 8*a*, . . . , 8*d*, respectively, via the ground and forms a path for the ion current i in cooperation with the capacitor 9 and the high-voltage diodes 11*a*, . . . , 11*d*.

The ion current detection signal Ei outputted from the current-to-voltage conversion circuit 12 is supplied to the electronic control unit (ECU) 2 by way of a signal processing means 13 which includes a waveform shaping circuit, a comparator and others. After having been processed by the signal processing means 13, the ion current detection signal Ei is supplied to the electric control unit 2 to be utilized for making decision as to whether the combustion state is satisfactory or not.

Now, referring to FIG. 6 along with FIG. 5, operation of the conventional combustion state detecting apparatus for the internal combustion engine will be described.

The electronic control unit 2 outputs the ignition signal P for turning on/off the power transistor TR as mentioned hereinbefore on the basis of the crank angle signal SGT derived from the crank angle sensor 1 and by taking into account other factors or parameters reflecting the engine operation state. The power transistor TR electrically conducts (i.e., assumes ON-state) when the ignition signal P is at a high or "H" level, to thereby allow the primary current i1 to flow through the primary winding 4*a* of the ignition coil 4, while interrupting the current i1 at the time point when the ignition signal P changes from the "H" level to a low or "L" level.

Upon interruption of the primary current i1, the primary voltage V1 rising steeply makes appearance across the primary winding. 4*a*, as a result of which the capacitor 9 is charged with a current flowing along the charging current path constituted by the rectifier diode D1, the current limiting resistor R, the capacitor 9, the rectifier diode D2 and the ground. Needless to say, charging of the capacitor 9 comes to an end when the voltage appearing across the capacitor 9 has reached the reverse or backward breakdown voltage of the Zener diode DZ. Thus, the voltage appearing across the capacitor 9 represents the bias voltage VBi.

When the primary voltage V1 makes appearance across the primary winding 4*a*, there is induced in the secondary winding 4*b* of the ignition coil 4 a secondary voltage V2 boosted up to the fiting or ignition voltage level on the order of several ten kilovolts. This secondary voltage V2 is applied distributively to the spark plugs 8*a*, . . . , 8*d* of the individual engine cylinders, respectively, by way of the distributor 7, which results in generation of the spark discharge within each of the combustion chambers of the engine cylinders. Thus, the air-fuel mixture undergoes combustion.

Upon combustion of the air-fuel mixture, ions are generated within the combustion chamber defined in the engine cylinder. The ion current i can flow under the bias voltage VBi supplied from the capacitor 9. By way of example, let's assume that combustion of the air-fuel mixture takes place within the combustion chamber of the engine cylinder equipped with the spark plug 8*a*. Then, the ion current i flows along a current path extending from the capacitor 9 to the current-to-voltage conversion circuit 12 by way of the diode 11*a*, the spark plug 8*a* and the ground or earth in this order.

The ion current i is converted to a voltage signal, i.e., the ion current detection signal Ei by means of the current-to-voltage conversion circuit 12, whereon the ion current detection signal Ei is supplied to the electronic control unit 2 after having undergone processing such as waveform shaping by the signal processing means 13 to be utilized for detection of misfire event, suppression of knocking phenomenon and for other controls.

In the combustion state detecting apparatus described above, it is noted that when performance of the spark plug 8*a*, . . . , 8*d* is degraded in the course of time lapse due to contamination or for any other reason, insulation resistance value of the spark plug becomes degraded or lower, giving rise to a flow of leakage current iL along the same current path as the ion current i at the time point when the bias voltage VBi is applied to the electrode of the spark plug for detecting the ion current.

Under the circumstances, the ion current detection signal Ei which is ultimately supplied to the electronic control unit 2 is superposed with a current component, i.e., the leakage current iL. Consequently, there may arise such situation that the engine operation state suffering occurrence of misfire or knocking is regarded by the electronic control unit 2 as a normal operation state of the engine because of a large ion current in appearance due to superposition of the leakage current component. In that case, the combustion state of the internal combustion engine can not be determined with reliability.

As will now be appreciated from the foregoing description, in the case of the combustion state detecting apparatus for the internal combustion engine known heretofore, no measures have been taken for coping with the leakage current iL brought about by contamination or the like of the spark plug 8*a*, . . . , 8*d*. Consequently, the ion current detection signal Ei as detected can not ensure high reliability, presenting a problem that the combustion state of the engine can not be determined with high accuracy and reliability.

SUMMARY OF THE INVENTION

In the light of the state of the art described above, it is an object of the present invention to provide a combustion state detecting apparatus for an internal combustion engine which apparatus is capable of detecting the combustion state in the internal combustion engine with high accuracy and reliability by deriving the ion current detection signal which is based on only the ion current with the leakage current component being canceled out.

In view of the above and other objects which will become apparent as the description proceeds, there is provided according to a general aspect of the present invention an apparatus for detecting combustion state in an internal combustion engine including at least one engine cylinder, which apparatus includes at least one spark plug mounted in the engine cylinder, an ignition coil for applying a high firing voltage to the spark plug for igniting an air-fuel mixture within the engine cylinder, at least one high-voltage diode connected to one end of the spark plug for applying a bias voltage to the spark plug with a same polarity as that of the firing voltage, a bias voltage supply means for applying a bias voltage to the spark plug by way of the aforementioned high-voltage diode, an ion current detecting means for detecting an ion current flowing through the spark plug under application of the bias voltage immediately after the ignition to thereby output an ion current detection signal, an electronic control unit for determining combustion state of the internal combustion engine on the basis of the ion current detection signal, and a leakage current compensating means connected in parallel with the ion current detecting means. The leakage current compensating means supplies a compensating current for canceling out a leakage current flowing along a same path as the ion current. The ion current detecting means outputs as the ion current detection signal only an ion current signal from which the leakage current has essentially been eliminated.

With the arrangement described above, there can be realized the combustion state detecting apparatus for the internal combustion engine which can detect the combustion state in the internal combustion engine with high accuracy and reliability.

In a preferred mode for carrying out the invention, the leakage current compensating means may be composed of a first compensating circuit for generating a first compensating current for compensating a substantially constant direct current component of the leakage current, an ignition detecting circuit for detecting a timing immediately following the ignition to thereby output an ignition detection signal, and a second compensating circuit means for generating a second compensating current for compensating a varying component of the leakage current immediately after the ignition in response to the ignition detection signal. The compensating current is given as a sum of the first compensating current and the second compensating current.

The first compensating circuit means generates a first compensating current by following the ion current detection signal with a first relatively large time constant. The second compensating circuit means generates the second compensating current with a second time constant smaller than the first time constant. Further, the second compensating current increases in response to the ignition detection signal and decreases at a predetermined rate of change in dependence on lowering of the bias voltage immediately in succession to the increasing of the second compensating current.

With the arrangement described above, there can be realized the combustion state detecting apparatus for the internal combustion engine which can detect the combustion state in the engine with high accuracy and reliability.

In another preferred mode for carrying out the invention, the first compensating circuit means may be so arranged as to include a direct current component extracting circuit for extracting a direct current component corresponding to the leakage current from the ion current detection signal with the first time constant, and a first compensating current supplying circuit for generating the first compensating current corresponding to the direct current component. On the other hand, the second compensating circuit means may be so arranged as to include a compensating quantity hold circuit for holding the ignition detection signal as a compensating quantity with the second time constant, and a second compensating current supplying circuit for generating a second compensating current corresponding to the compensating quantity.

By virtue of the arrangement described above, there can be realized the combustion state detecting apparatus for the internal combustion engine which can detect accurately and reliably the combustion state of the internal combustion engine with a relatively simplified and inexpensive circuit configuration.

In a further preferred mode for carrying out the invention, the leakage current compensating means may be composed of an ignition detecting circuit for detecting a timing following immediately every ignition to thereby output an ignition detection signal, and a compensating circuit means which allows the compensating current to increase in response to the ignition detection signal and then decrease at a predetermined rate of change in dependence on lowering of the bias voltage immediately in succession to the increasing of the compensating current. The compensating current may be increased as the rotation speed of the internal combustion engine is increased.

With the arrangement described above, there can be realized the combustion state detecting apparatus for the internal combustion engine which can detect the combustion state in the engine with high accuracy.

Further, in the apparatus for detecting the combustion state in the internal combustion engine, the compensating circuit means may be constituted by a compensating quantity hold circuit for holding the ignition detection signal as a compensating quantity with a predetermined time constant, and a compensating current supplying circuit for generating the compensating current corresponding to the compensating quantity.

By virtue of the arrangement described above, there can be realized the combustion state detecting apparatus for the internal combustion engine which can detect accurately the combustion state of the internal combustion engine with a relatively simplified circuit configuration.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
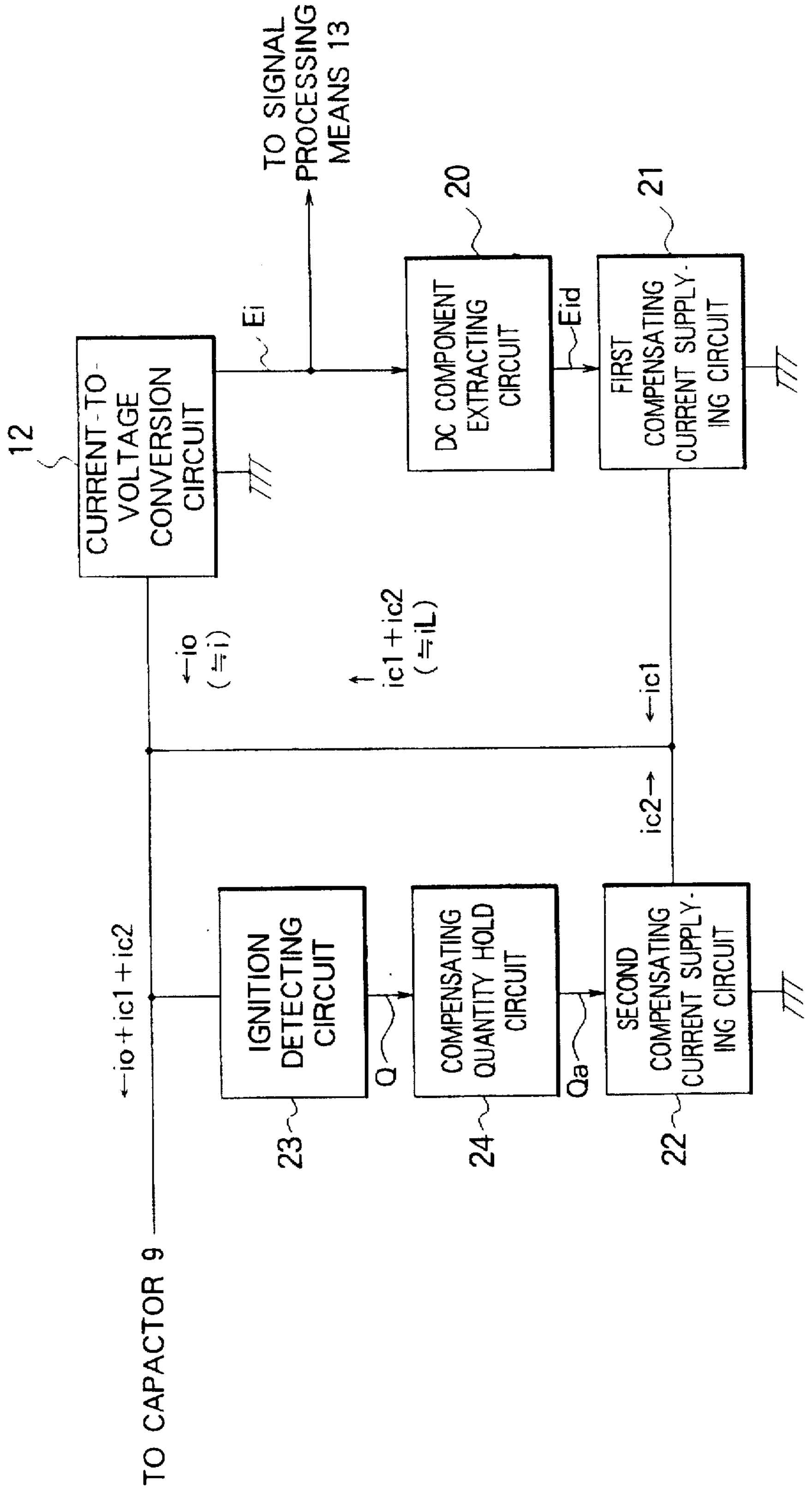
FIG. 1 is a block diagram showing a major portion of a combustion state detecting apparatus according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 5:
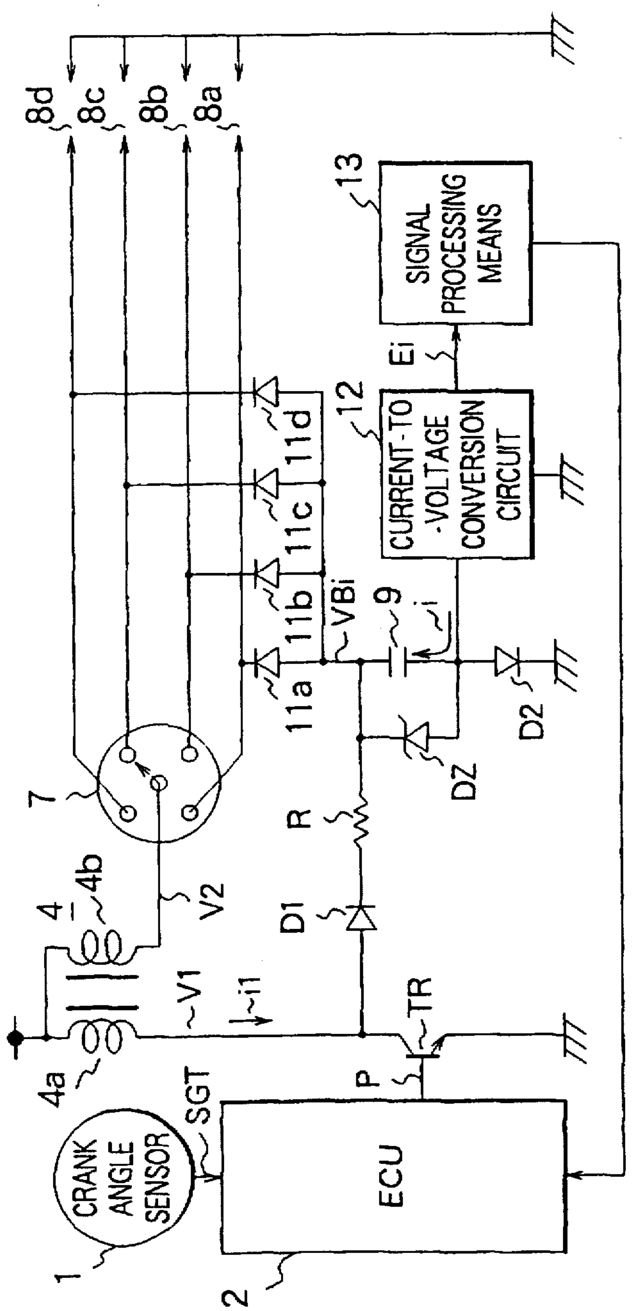
FIG. 5 PRIOR ART
FIG. 5 is a block diagram showing generally a configuration of a conventional combustion state detecting apparatus for an internal combustion engine in which an ion current is detected for determining the combustion state.
Figure 6:
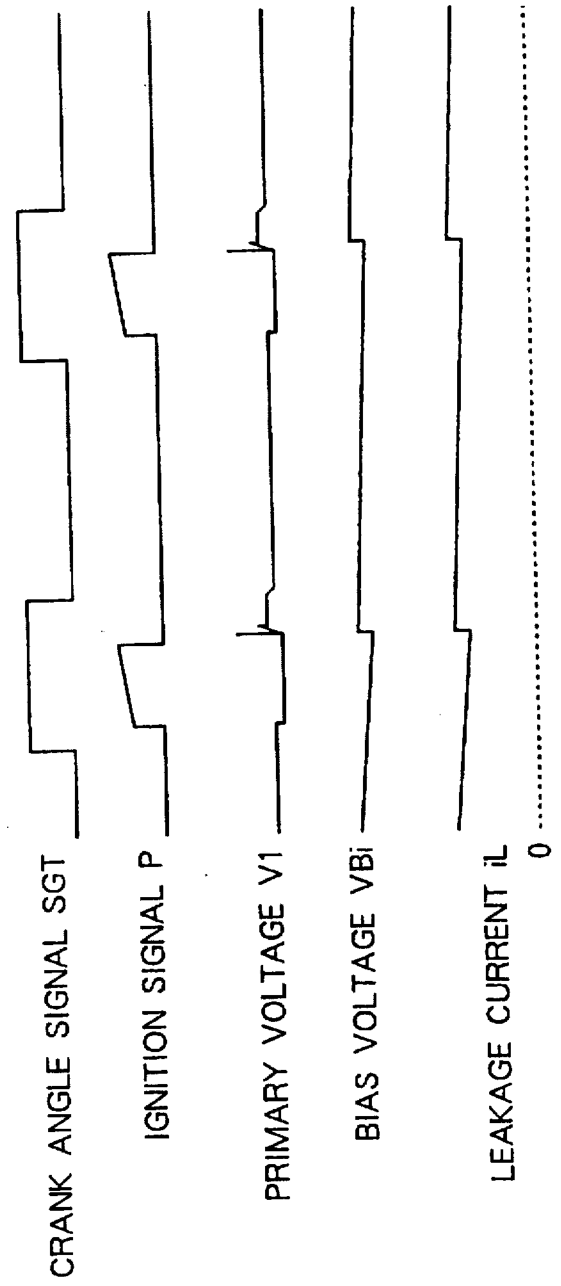
FIG. 6 PRIOR ART
FIG. 6 is a timing chart showing relevant signal waveforms for illustrating operation of the conventional combustion state detecting apparatus.

FIG. 1 is a block diagram showing a major portion of a combustion state detecting apparatus for an internal combustion engine according to a first embodiment of the present invention. At this junction, it should be mentioned that FIG. 1 shows an arrangement of components for realizing the teachings of the present invention. Except for this respect, the other portion of the combustion state detecting apparatus is implemented substantially in a same configuration as the conventional apparatus described hereinbefore by reference to FIGS. 5 and 6.

Figure 2:
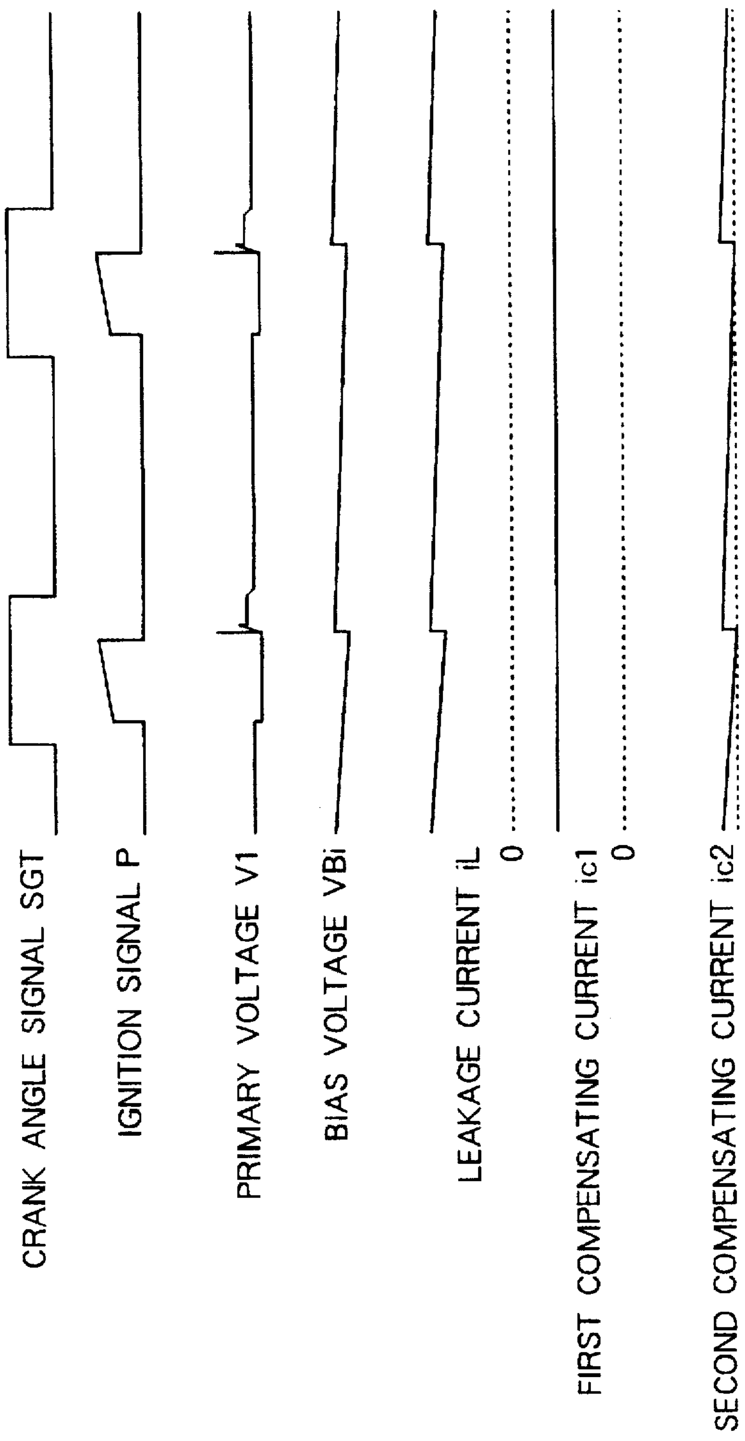
FIG. 2 is a timing chart showing relevant signal waveforms for illustrating operation of the combustion state detecting apparatus according to the first embodiment of the invention.

Further, FIG. 2 is a timing chart showing relevant signal waveforms for illustrating operation of the combustion state detecting apparatus according to the first embodiment of the invention. Parenthetically, FIG. 2 is depicted on the presumption that a leakage current iL is generated simultaneously with the ion current i due to contamination of spark plug 8a, . . . , 8d or for other reason. Furthermore, although the following description is made on the assumption that the invention is applied to a four-cylinder engine, this is only for convenience of description. It goes without saying that the invention is never restricted to the application for the four-cylinder engine.

Now, referring to FIG. 1, there are provided in association with the current-to-voltage conversion circuit 12 a first compensating current supplying circuit 21 and a second compensating current supplying circuit 22 in juxtaposition in the path for the ion current i and the leakage current iL between input and output terminals of the current-to-voltage conversion circuit 12, respectively.

The first compensating current supplying circuit 21 and the second compensating current supplying circuit 22 are so designed and combined as to cooperate with each other for deriving or separating a first compensating current ic1 and a second compensating current ic2 (each corresponding to the leakage current iL mentioned hereinbefore) from an ion current superposed with a leakage current (i.e., i+iL) flowing to the current-to-voltage conversion circuit 12 via the spark plug 8a, . . . , 8d and the capacitor 9 for thereby canceling out the leakage current iL with the first and second compensating currents ic1 and ic2.

More specifically, the first compensating current supplying circuit 21 is connected to the ion current detection signal output terminal of the current-to-voltage conversion circuit 12 by way of a DC (direct current) component extracting circuit 20 for extracting from the ion current detection signal Ei a DC (direct current) component Eid (which corresponds to the leakage current iL in the spark plug 8a, . . . , 8d.

On the other hand, the second compensating current supplying circuit 22 is connected to the input terminal of the current-to-voltage conversion circuit 12 by way of an ignition detecting circuit 23 connected to a lower voltage terminal of the capacitor 9 for producing an ignition detection signal Q, and a compensating quantity hold circuit 24 for holding as a compensating quantity Qa a variable component (corresponding to that of the leakage current iL) of the ignition detection signal Q (corresponding to a variable component of the leakage current iL).

The DC component extracting circuit 20 connected to the ion current detection signal output terminal of the current-to-voltage conversion circuit 12 incorporates a capacitor (not shown) for holding a voltage value (a DC component) Eid which corresponds to a first compensating current ic1 for canceling out a steady component (DC component) corresponding to the leakage current iL on the basis of the ion current detection signal Ei, to thereby extract the DC component Eid with a first time constant of a relatively large value, wherein the extracted DC component Eid is inputted to the first compensating current supplying circuit 21.

The first compensating current supplying circuit 21 inserted between the lower voltage terminal of the capacitor 9 and the ground potential responds to the input of the DC component Eid derived with the first time constant, to thereby supply to the lower voltage terminal of the capacitor 9 a DC current or a current component of the steady level as the first compensating current ic1.

The ignition detecting circuit 23 connected to the lower voltage terminal of the capacitor 9 serves to detect a forward voltage making appearance across the rectifier diode D2 (see FIG. 5) which voltage represents the charging current supplied to the capacitor 9 and hence the level of the bias voltage VBi) as charged, to thereby output the ignition detection signal Q at a timing immediately after the ignition, which timing, of course, depends on the rotation speed (rpm) of the internal combustion engine.

The compensating quantity hold circuit 24 connected to the output side of the ignition detecting circuit 23 includes a capacitor (not shown) for holding as the compensating quantity Qa a voltage level or value corresponding to a second compensating current ic2 for compensating variation (varying component) of the leakage current iL on the basis of the ignition detection signal Q, and a discharge circuit (not shown) which cooperates with the aforementioned capacitor and has a second time constant smaller than the first time constant, whereby a voltage corresponding to the second compensating current ic2 (i.e., integral voltage of variation component of the ignition detection signal Q) is inputted to the second compensating current supplying circuit 22 as a compensating quantity Qa.

The second compensating current supplying circuit 22 inserted between the lower voltage terminal of the capacitor 9 and the ground potential responds to the compensating quantity Qa based on the second time constant mentioned above to thereby supply the second compensating current ic2 to the capacitor 9 for compensating a variation component of the leakage current iL (see a triangular waveform current component illustrated in FIG. 2).

As described previously, when the leakage current iL is generated, the current actually flows by way of the capacitor 9 (constituting the bias voltage supply means) and the spark plug 8a, . . . , 8d is given as a sum of the intrinsic ion current component i and the leakage current component iL.

At that time, the DC component extracting circuit 20 performs a positive feedback control for the ion current detection signal Ei with the first time constant of a relatively large value, to thereby output the DC component Eid, while the first compensating current supplying circuit 21 generates the first compensating current ic1 based on the DC component Eid, to thereby compensate the DC or steady component of the leakage current iL.

In this manner, the first compensating current supplying circuit 21 is so designed as not to respond to the component corresponding to the ion current i, but generates the first compensating current ic1 which corresponds to only the leakage current iL generated at the spark plug 8a, . . . , 8d.

On the other hand, the second compensating current supplying circuit 22 responds to the compensating quantity Qa applied from the compensating quantity hold circuit 24 to thereby output the second compensating current ic2 which rises up upon every ignition, being immediately followed by decreasing of the second compensating current ic2, at a predetermined rate of change or variation in dependence on lowering of the bias voltage VBi. In this manner, the current component corresponding to variation (ripple component) of the leakage current iL brought about by change of the bias voltage VBi can be compensated.

To say in another way, variation or change (ripple component) of the leakage current iL brought about by variation of the bias voltage VBi can not be compensated for or canceled out only with the first compensating current ic1. For this reason, the second compensating current supplying circuit 22 is so designed as to output the second compensating current ic2 corresponding to the variation or change (ripple component) of the leakage current iL on the basis of the capacitor voltage discharged with the second time constant internally of the compensating quantity hold circuit 24.

In that case, an actual current io flowing through the current-to-voltage conversion circuit 12 can be given by the following expression (1):

$$io=(i+iL)-(ic1+ic2) \qquad (1)$$

In this conjunction, it should be noted that the relation between the first and second compensating currents ic1 and ic2 and the leakage current iL can be given by the following expression (2):

$$ic1+ic2\approx iL \qquad (2)$$

From the expression (2), the expression (1) can be rewritten as follows:

$$io\approx i \qquad (3)$$

As will now be understood from the foregoing, with the compensating current given as a sum of the first compensating current ic1 and the second compensating current ic2, it is possible to cancel out the current component corresponding to the leakage current iL with high accuracy, which in turn means that the ion current detection signal Ei detected by the current-to-voltage conversion circuit 12 can assume a current value which corresponds essentially to the intrinsic ion current i.

Thus, the electronic control unit 2 can make decision concerning the combustion state of the engine with significantly enhanced reliability on the basis of the ion current detection signal Ei which ensures high accuracy without being affected by the leakage current iL.

In the foregoing description of the combustion state detecting apparatus for the engine according to the first embodiment of the invention, it has been assumed that the high firing voltage is applied to the spark plug 8*a*, . . . , 8*d* with positive polarity so that the ion current i flows out from the capacitor 9. However, it goes without saying that equivalent action and effect can equally be ensured even when the direction in which the ion current i flows is reversed by connecting the high-voltage diodes 11*a*, . . . , 11*d* with reverse polarity.

Embodiment 2

In the case of the combustion state detecting apparatus according to the first embodiment of the invention of the invention, the first compensating current supplying circuit 21 for compensating the leakage current iL for the steady or constant DC component is provided in parallel with the second compensating current supplying circuit 22 for canceling out the varying component of the leakage current. However, for the detection of the ion current i in the state where the internal combustion engine is operated at a high rotation speed (e.g. at 3000 rpm or higher), only the second compensating current supplying circuit 22 may be provided, while sparing the first compensating current supplying circuit 21.

Figure 3:
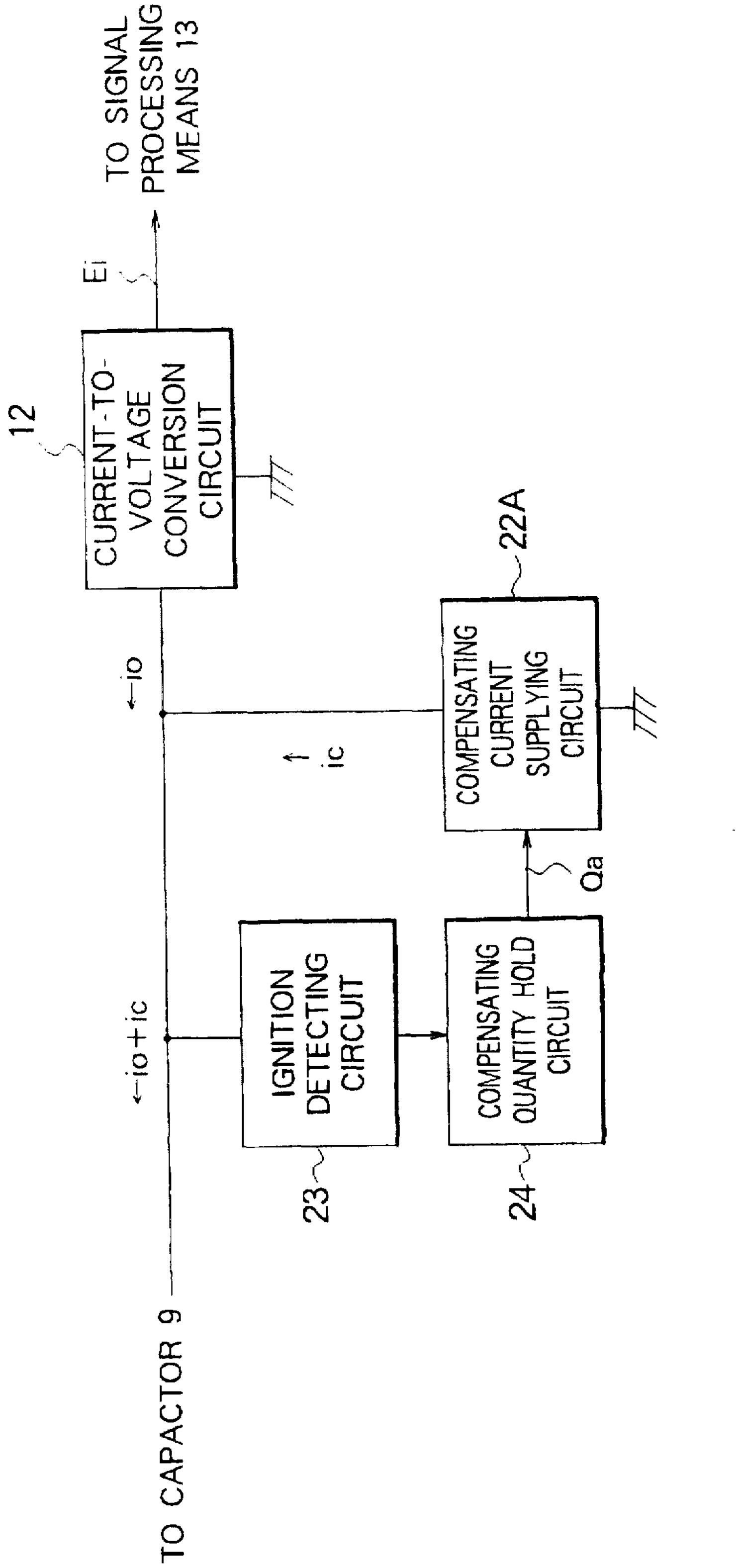
FIG. 3 is a block diagram showing a major portion of a combustion state detecting apparatus according to a second embodiment of the present invention.

FIG. 3 is a block diagram showing a major portion of the combustion state detecting apparatus according to a second embodiment of the present invention. Except for the arrangement shown in FIG. 3, the combustion state detecting apparatus is implemented substantially in a same configuration as the conventional apparatus described hereinbefore by reference to FIGS. 5 and 6.

Figure 4:
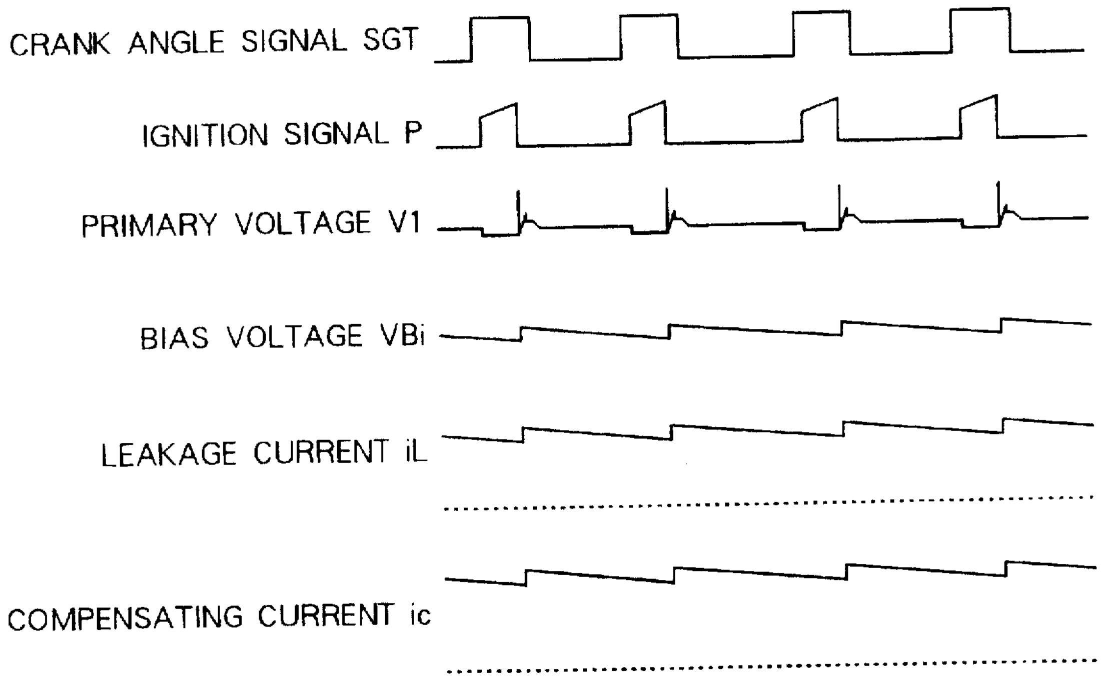
FIG. 4 is a timing chart showing relevant signal waveforms for illustrating operation of the combustion state detecting apparatus according to the second embodiment.

Further, FIG. 4 is a timing chart showing relevant signal waveforms for illustrating operation of the combustion state detecting apparatus according to the second embodiment of the invention, which shows waveforms of the signals appearing when the engine is operated at a high rotation speed, as mentioned above.

Referring to FIG. 3, there is provided a compensating current supplying circuit 22A for canceling out the leakage current iL in the current path for the ion current i and the leakage current iL, respectively, wherein a compensating current supplying circuit 22A is provided in combination with the ignition detecting circuit 23 and the compensating quantity hold circuit 24 mentioned previously. In the combustion state detecting apparatus according to the second embodiment of the invention, the DC component extracting circuit 20 and the first compensating current supplying circuit 21 are spared, as can easily be understood by comparing the arrangement shown in FIG. 1 with that of FIG. 3.

The compensating quantity hold circuit 24 includes a capacitor adapted to discharge with a second time constant, for thereby outputting the compensating quantity Qa.

In the combustion state detecting apparatus according to the instant embodiment of the invention, the current conversion rate of the compensating current supplying circuit 22A is set at a greater value than that of the second compensating current supplying circuit 22 mentioned hereinbefore. Consequently, a compensating current ic for the compensating quantity Qa assumes a greater value than that described previously. See FIG. 4.

The second compensating current supplying circuit 22 increases the compensating current ic upon every ignition in response to the compensating quantity Qa supplied from the compensating quantity hold circuit 24 and decreases subsequently the compensating current ic at a predetermined rate of change based on a predetermined time constant.

The capacitor incorporated in the compensating quantity hold circuit 24 is charged in response to the ignition signal Q detected upon every ignition. Accordingly, the compensating current ic supplied from the second compensating current supplying circuit 22 increases as the rotation speed (rpm) of the engine increases, as a result of which the compensating current ic contains a DC component, as can be seen in FIG. 4.

Thus, the leakage current iL can be canceled out even when the first compensating current supplying circuit 21 is not provided so long as the engine is operating in a high-speed operation state, whereby the ion current detection signal Ei can assume a value corresponding to only the intrinsic ion current i.

As is apparent from the foregoing description in the case of the combustion state detecting apparatus according to the second embodiment of the invention, the engine combustion state can be decided with high accuracy and reliability on the basis of the ion current detection signal Ei, detected with high accuracy.

In this conjunction, it should be mentioned that the engine rotation speed at which the leakage current iL can be compensated only by the compensating current ic may be altered, as occasion requires, in dependence on the design or specifications of the second compensating current supplying circuit 22 actually employed.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described on the assumption that it is applied to a four-cylinder engine, it should be mentioned that the invention is never restricted to such internal combustion engine, but can equally find application to other internal combustion engine including less or more than four cylinders. Furthermore, the invention has been described in conjunction with the distributor type ignition system. However, this is only by way of example. It goes without saying that the invention can equally be applied to the engine of other ignition type such as the engine equipped with distributor-less or direct ignition system.

Accordingly, all suitable modifications and equivalents may be resorted to, falling within the spirit and scope of the invention.

What is claimed is:

1. An apparatus for detecting combustion state in an internal combustion engine including at least one engine cylinder, comprising:

at least one spark plug mounted in said engine cylinder;

an ignition coil for applying a high firing voltage to said spark plug for igniting an air-fuel mixture within said engine cylinder;

at least one high-voltage diode connected to one end of said spark plug for applying a bias voltage to said spark plug with a same polarity as that of said firing voltage;

bias voltage supply means for applying a bias voltage to said spark plug by way of said high-voltage diode;

ion current detecting means for detecting an ion current flowing through said spark plug under application of said bias voltage immediately after said ignition to thereby output an ion current detection signal;

an electronic control unit for determining combustion state of said internal combustion engine on the basis of said ion current detection signal; and leakage current compensating means connected in parallel with said ion current detecting means, wherein said leakage current compensating means supplies a compensating current for canceling out a leakage current flowing along a same path as said ion current, and wherein said ion current detecting means outputs as said ion current detection signal only an ion current signal from which said leakage current has essentially been eliminated.

2. An apparatus for detecting combustion state in an internal combustion engine according to claim 1, wherein said leakage current compensating means includes:

a first compensating circuit for generating a first compensating current for compensating a substantially constant direct current component of said leakage current;

an ignition detecting circuit for detecting a timing immediately following said ignition to thereby output an ignition detection signal; and second compensating circuit means for generating a second compensating current for compensating a varying component of said leakage current immediately after said ignition in response to said ignition detection signal;

said compensating current being given as a sum of said first compensating current and said second compensating current;

said first compensating circuit means generating a first compensating current by following said ion current detection signal with a first relatively large time constant;

said second compensating circuit means generating said second compensating current with a second time constant smaller than said first time constant; and said second compensating current increasing in response to said ignition detection signal and decreasing at a predetermined rate of change in dependence on lowering of said bias voltage immediately in succession to said increasing of said second compensating current.

3. An apparatus for detecting combustion state in an internal combustion engine according to claim 2, wherein said first compensating circuit means includes:

a direct current component extracting circuit for extracting a direct current component corresponding to said leakage current from said ion current detection signal with said first time constant; and a first compensating current supplying circuit for generating said first compensating current corresponding to said direct current component, and wherein said second compensating circuit means includes:

a compensating quantity hold circuit for holding said ignition detection signal as a compensating quantity with said second time constant; and a second compensating current supplying circuit for generating a second compensating current corresponding to said compensating quantity.

4. An apparatus for detecting combustion state in an internal combustion engine according to claim 1, wherein said leakage current compensating means includes:

an ignition detecting circuit for detecting a timing following immediately every ignition to thereby output an ignition detection signal; and compensating circuit means for increasing said compensating current in response to said ignition detection signal and then decreasing said compensating current at a predetermined rate of change in dependence on lowering of said bias voltage immediately in succession to said increasing of said compensating current;

wherein said compensating current is increased as rotation speed of said internal combustion engine is increased.

5. An apparatus for detecting combustion state in an internal combustion engine according to claim 4, wherein said compensating circuit means includes:

a compensating quantity hold circuit for holding said ignition detection signal as a compensating quantity with a predetermined time constant; and a compensating current supplying circuit for generating said compensating current corresponding to said compensating quantity.

* * * * *